United States Patent
Kang et al.

(10) Patent No.: US 7,904,703 B1
(45) Date of Patent: Mar. 8, 2011

(54) METHOD AND APPARATUS FOR IDLING AND WAKING THREADS BY A MULTITHREAD PROCESSOR

(75) Inventors: Jack Kang, Sunnyvale, CA (US); Yu-Chi Chuang, Jhubei (TW)

(73) Assignee: Marvell International Ltd., Hamilton (BM)

( * ) Notice: Subject to any disclaimer, the term of this patent is extended or adjusted under 35 U.S.C. 154(b) by 463 days.

(21) Appl. No.: 11/775,661

(22) Filed: Jul. 10, 2007

Related U.S. Application Data

(60) Provisional application No. 60/911,069, filed on Apr. 10, 2007.

(51) Int. Cl.
  *G06F 9/00* (2006.01)
(52) U.S. Cl. .............................. 712/229; 712/42; 712/244
(58) Field of Classification Search .................... 712/42, 712/229; 710/244
  See application file for complete search history.

(56) References Cited

U.S. PATENT DOCUMENTS

| | | | |
|---|---|---|---|
| 5,450,592 A * | 9/1995 | McLeod ........................ | 718/104 |
| 6,311,287 B1 * | 10/2001 | Dischler et al. ............... | 713/601 |
| 7,062,766 B2 * | 6/2006 | Ronkka et al. ................ | 718/100 |
| 7,581,223 B2 * | 8/2009 | Harjula ........................ | 718/104 |
| 2002/0007387 A1 * | 1/2002 | Ginsberg ...................... | 709/102 |
| 2003/0033345 A1 * | 2/2003 | Keefer et al. ................. | 709/102 |
| 2003/0097395 A1 * | 5/2003 | Petersen ....................... | 709/102 |
| 2003/0120706 A1 * | 6/2003 | Harjula ........................ | 709/104 |
| 2004/0088710 A1 * | 5/2004 | Ronkka et al. ................ | 718/107 |
| 2004/0187120 A1 * | 9/2004 | Moore et al. ................. | 718/100 |
| 2005/0108711 A1 * | 5/2005 | Arnold et al. ................. | 718/100 |
| 2006/0048156 A1 * | 3/2006 | Lim et al. ..................... | 718/102 |
| 2006/0136915 A1 * | 6/2006 | Aingaran et al. ............. | 718/100 |
| 2006/0156306 A1 * | 7/2006 | Di Gregorio et al. ......... | 718/102 |
| 2006/0212689 A1 * | 9/2006 | Chaudhry et al. ............ | 712/228 |
| 2007/0300227 A1 * | 12/2007 | Mall et al. ..................... | 718/102 |

* cited by examiner

*Primary Examiner* — Aimee J Li

(57) ABSTRACT

A system, apparatus and method for idling and waking threads by a multithread processing device are described herein. Embodiments of the present invention provide a multithread processing device for idling and waking threads including a scheduler configured to determine a bandwidth request mode of a first instruction execution thread and allocate zero execution cycles of an instruction execution period to the first instruction execution thread if the bandwidth request mode is an idle mode. In various embodiments, the multithread processing device may be configured to wake the first instruction thread by allocating one or more execution cycles to the first instruction execution thread if the bandwidth request mode is modified to a wake mode. Other embodiments may be described and claimed.

25 Claims, 3 Drawing Sheets

METHOD AND APPARATUS FOR IDLING AND WAKING THREADS BY A MULTITHREAD PROCESSOR

CROSS REFERENCE TO RELATED APPLICATIONS

The present application claims priority to U.S. Provisional Patent Application No. 60/911,069, filed Apr. 10, 2007, entitled "METHOD AND APPARATUS FOR IDLING AND WAKING THREADS BY A MULTITHREAD PROCESSOR", the entire disclosure of which is hereby incorporated by reference in its entirety.

TECHNICAL FIELD

Embodiments of the present invention relate to the field of data processing, in particular, to techniques for idling and waking threads in a multithread processing environment.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multi-thread processing by employing an operating system to manage hardware resource usage and thread switching. However, a significant performance penalty is incurred each time the processor changes threads. Additional inefficiency occurs in a single pipeline processor when a thread is initially allocated a block of execution cycles, but is unable to execute consecutive instructions as scheduled because necessary component data is unavailable.

More recently, techniques for processing multiple threads on a single processor core have been developed that reduce the penalty for thread switching. However, changing the allocation of processing cycles in such systems is performed through a processor issuing instructions to change the cycle count for each thread, which may present various challenges with respect to response time, precision, and predictability.

For example, changing cycle allocation could require up to one instruction per thread. As the master thread may be the only thread with the capability to change the cycle count, it may take many (potentially hundreds) of cycles before the master thread can finish reprogramming the cycles. Since multiple instructions may be required for changing the cycle allocation, and the instructions are not atomic (e.g., other threads may switch in while the master thread is changing the allocation), there may be rounds of imprecise allocation.

Other inefficiencies arise by allocating cycles to a thread even if the thread is not currently executing an instruction. A thread in this situation may loop, wasting processing resources, until the thread is needed. In addition, it may be difficult for the software to know exactly when the cycle allocation needs to occur and so in order to get feedback, polling or other feedback techniques may need to be employed, further wasting processing resources. Moreover, due to challenges with response time and related to the non-atomic nature of the instructions, accurately simulating worst-case behavior may become problematic, thereby sacrificing predictability of the system.

SUMMARY OF THE INVENTION

In view of the challenges in the state of the art, embodiments of the present invention are directed to idling at least one instruction execution thread during one or more instruction execution periods, and subsequently waking the instruction execution thread for processing instructions of the instruction execution thread.

More specifically, with the foregoing and other considerations in view, there is provided, in accordance with various embodiments of the invention, a method for thread idling including determining a bandwidth request mode of an instruction execution thread, and if the bandwidth request mode is an idle mode, allocating zero execution cycles of an instruction execution period to the instruction execution thread. In various embodiments, if the bandwidth request mode is in a wake mode, the method may include allocating one or more execution cycles to the instruction execution threads. In various embodiments, the method may include executing instructions of a plurality of instruction execution threads according to the allocation of bandwidth request mode.

In various embodiments, more than one instruction execution thread may have a particular bandwidth request mode. For example, one or more instruction execution threads may be in an idle mode while one or more other instruction execution threads are in a wake mode. In some embodiments, however, a particular bandwidth request mode may be limited to a particular instruction execution thread and/or to one instruction execution thread at a time.

According to various embodiments, the method may include modifying the bandwidth request mode for one or more instruction execution threads. For example, the bandwidth request mode may be modified from an idle mode to a wake mode, and/or vice versa. Although the manner in which the bandwidth request mode is modified may depend on the particular application, in some embodiments, the bandwidth request mode may be modified by modifying (e.g., setting/un-setting) a control bit of a register associated with a particular thread.

In various embodiments, the bandwidth request mode may be modified in response to an instruction(s) of one or more instruction execution threads. In some embodiments, however, the bandwidth request mode may be modified from the idle mode to the wake mode in response to some event such as, for example, an interrupt and/or an exception. In various ones of these embodiments, one or more instructions of a service routine may be executed in response to the received event, and sometimes, one or more instructions of the service routine may include an instruction to modify the bandwidth request mode from the idle mode to the wake mode.

A multithread processing device is also described, suitable to solve the problems, which at least one embodiment of the present invention is based on, with a scheduler configured to allocate execution cycles to an instruction execution thread based at least in part on a bandwidth request mode of the instruction execution thread.

According to some embodiments, the multithread processing device may include an execution block operatively coupled to the scheduler and configured to execute instructions of a plurality of instruction execution threads according to the allocation provided by the scheduler.

In various embodiments, the scheduler may be configured to allocate zero execution cycles of an instruction execution period to a first instruction execution thread if the bandwidth request mode is an idle mode, and in some embodiments, the scheduler may be configured to allocate one or more execution cycles to the first instruction execution thread if the bandwidth request mode is a wake mode. According to various embodiments, the bandwidth request mode is modifiable between the idle mode and the wake mode. In various embodiments, the bandwidth request mode of a first instruction execution thread may be selectively modifiable by an instruction of a second instruction execution thread. In some embodiments, however, the bandwidth request mode of the first instruction execution thread may be selectively modifiable by only the first instruction execution thread, and not by the second (or another) instruction execution thread.

According to various embodiments, the bandwidth request mode may be modified from the idle mode to the wake mode in response to an interrupt and/or an exception. The execution block may be configured to execute one or more instructions of a service routine in response to the received interrupt and/or event, and in various embodiments, at least one instruction of the service routine may include an instruction to modify the bandwidth request mode from the idle mode to the wake mode.

In various embodiments, the multithread processing device may include one or more registers associated with the first instruction execution thread and configured to store the bandwidth request mode. According to various ones of these embodiments, a register associated with a particular thread may include a control bit, which may be set and un-set to idle and wake the instruction execution thread.

In various embodiments, the multithread processing device may include means for scheduling configured to, determine a bandwidth request mode of a first instruction execution thread, allocate zero execution cycles of an instruction execution period to the first instruction execution thread if the bandwidth request mode is an idle mode, and allocate one or more execution cycles to the first instruction execution thread if the bandwidth request mode is a wake mode.

According to some embodiments, the multithread processing device may include means for executing instructions of a plurality of instruction execution threads according to the allocation provided by the means for scheduling. In various embodiments, the execution means may include any instruction execution means such as a processing core co-disposed in an integrated circuit package with the scheduling means. In some embodiments, the multithread processing device may include an instruction dispatch means, such as an instruction unit responsible for ensuring that instructions are properly decoded, fetched, queued, and dispatched for execution. Besides containing control circuitry for performing these functions, the instruction dispatch means may also include additional storage means, such as an instruction cache and/or a data cache In accordance with again an additional feature of at least one embodiment of the invention, the processing device is a processor. In accordance with still a further feature of at least one embodiment of the invention, the processing device is an embedded processor. In accordance with a concomitant feature of the invention, the processing device is an integrated circuit.

Other features that are considered as characteristic for various embodiments of the present invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous. The phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

Certain embodiments may describe methods by reference to flow diagrams to enable one skilled in the art to develop programs including instructions to carry out the methods on suitably configured processing devices, such as a multi-thread processor of a computing device executing the instruction execution threads from machine-accessible media. The computer-executable instructions may be written in a computer programming language or may be embodied in firmware logic. If written in a programming language conforming to a recognized standard, such instructions can be executed on a variety of hardware platforms and for interface to a variety of operating systems, such as multi-thread aware and non-multi-thread operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application, etc.), as taking an action or causing a result. Such expressions are merely a shorthand way of saying that execution of the software by a device causes the processor of the computer to perform an action or produce a result.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
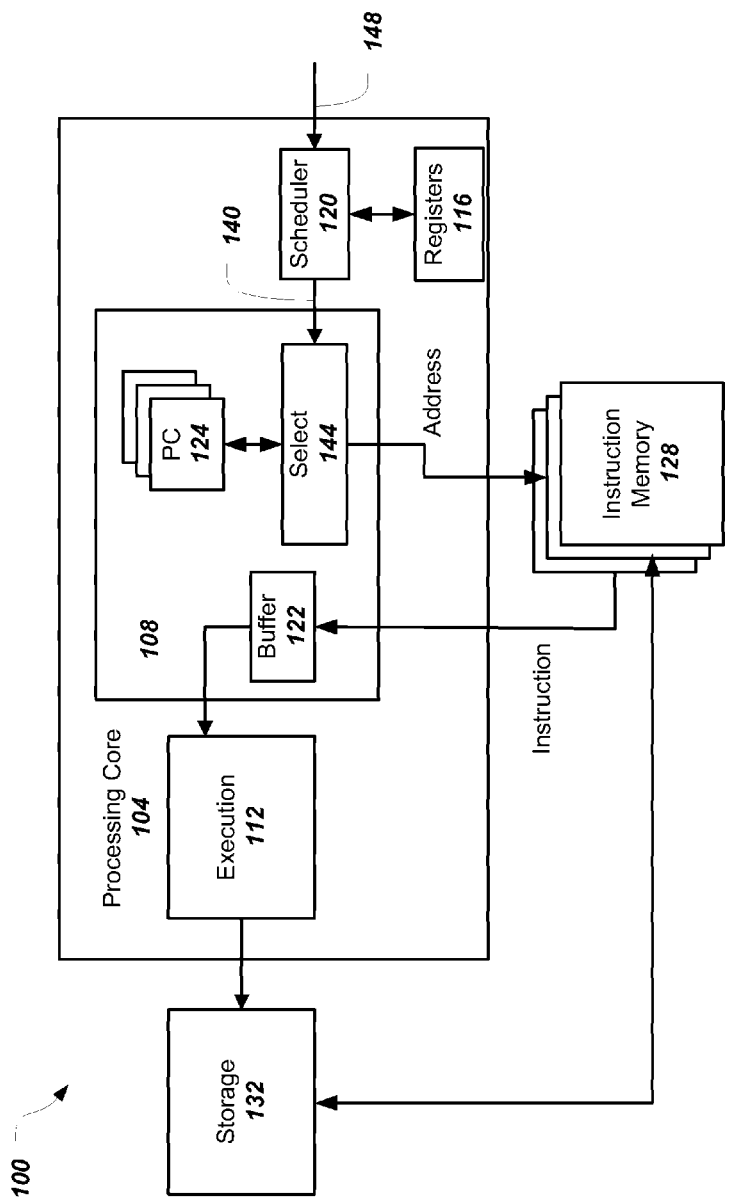
FIG. 1 is a block diagram of a multithread processing system, in accordance with various embodiments of the present invention.

Referring to FIG. 1, a block diagram illustrates an exemplary multithread processing environment 100 (hereinafter "processing environment 100") including multithread processing core 104 (hereinafter "processing core 104") with instruction dispatcher 108, execution circuitry 112, registers 116, and scheduler 120 that are operatively coupled to each other at least as shown. In alternate embodiments, the present invention may be practiced with other processing environments and may include various system devices in addition to or instead of the illustrated system devices.

In accordance with various embodiments, instruction dispatcher 108 may be configured to interleavingly fetch and issue instructions from multiple instruction execution threads for execution by execution circuitry 112. The fetched and issued instructions may be arranged in buffer 122 for presentation to execution circuitry 112. Such a configuration may improve the performance (e.g., per area/power) for a system running multiple tasks simultaneously. In an embodiment, instruction dispatcher 108 may fetch and issue instructions from at least a first instruction execution thread and a second instruction execution thread, for execution by the execution circuitry 112.

In various embodiments, instruction dispatcher 108 may provide for a thread switch when changing between instruction execution threads. As such, an instruction from a second thread may be executed immediately after an instruction from a first thread, such that the respective instructions may be executed on subsequent cycles.

Instruction dispatcher 108 may be coupled to execution circuitry 112 and include at least one program counter 124 for each instruction execution thread to interleave the threads and to switch the processing core 104 between threads by switching which program counter 124 provides the next instruction. Accordingly, switching may associate each thread with a unique allocated program counter 124. In an embodiment, instruction dispatcher 108 of processing core 104 may associate a first program counter 124 with the first instruction execution thread and at least one other program counter 124 with each additional instruction execution thread. In an embodiment, each instruction execution thread may have a different program counter 124.

In one embodiment, instruction dispatcher 108 may alternatively provide switching using dedicated registers of registers 116 associated with each thread. The dedicated thread registers may each be configured to load the address into program counter 124 of the next instruction to be executed based on which thread is selected next. In various embodiments, at least some of registers 116 may be coupled directly to instruction dispatcher 108. Registers 116 may also include the number of cycles a particular thread should be active, as will be discussed in further detail below.

Processing environment 100 may also illustrate various closely associated system devices, which may be coupled to the processing core 104. In various embodiments, devices may include instruction memory 128 and storage 132. In various embodiments, instruction memory 128 may include various memory and/or cache structures configured to store instructions and/or data relating to the various threads in a manner to provide timely responses to fetch requests from instruction dispatcher 108. In various embodiments, the cache structures may include multiple levels of caches (e.g., L1 and/or L2 cache).

Execution of the thread instructions by processing core 104 may result in read and/or write operations being performed with respect to the storage 132. Storage 132 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, storage 132 may comprise other and/or later-developed types of computer-readable memory including electrical, optical, acoustical or other forms of propagated signals (e.g., carrier waves, infrared signals, digital signals). Machine-readable firmware program instructions may be stored in storage 132. In one embodiment, storage 132 may include any storage medium or machine-accessible medium and/or any storage mechanism that provides (i.e., stores and/or transmits) information in a form readable by a machine (e.g., a computer).

In an embodiment, scheduler 120 may control the successive fetching and issuing of instructions by instruction dispatcher 108. More specifically, in at least one embodiment, scheduler 120 may output a thread selection signal along select line 140 to instruction dispatcher 108, and to select circuitry 144 in particular, to control the successive fetching and issuing of instructions by instruction dispatcher 108. In one embodiment, scheduler 120 controls interleavingly fetching and issuing of instructions by instruction dispatcher 108, based at least in part on corresponding contiguous execution clock cycle allocations of the instruction execution threads. In one embodiment, instruction dispatcher 108 is adapted to fetch and issue at least one instruction from an instruction memory 128 for a selected one of a first and a second instruction execution thread each time instruction dispatcher 108 is signaled by scheduler 120 to fetch instructions for the selected one of the first and second instruction execution threads. While illustrated in FIG. 1 as part of processing core 104 and coupled to instruction dispatcher 108, scheduler 120 may be included within instruction dispatcher 108.

Scheduler 120, by controlling the successive fetching and issuing of instructions by instruction dispatcher 108, may determine the execution cycle allocation for the instruction execution period for each of the plurality of instruction execution threads. More specifically, in at least one embodiment, scheduler 120 may detect an event on one or more allocation inputs 148 to control allocation of a plurality of execution cycles of an execution instruction period to the plurality of instruction threads. Scheduler 120, upon detecting an event on allocation inputs 148, may determine an allocation mode of processing environment 100. In various embodiments, scheduler 120 may determine the allocation mode by referencing a bandwidth allocation table stored in registers 116. The bandwidth allocation table may include a number of allocation modes corresponding to various detected events.

In various embodiments, processing environment 100 may be configured to place one or more instruction execution threads into an idle mode, the idled instruction execution threads being allocated zero execution cycles during an execution period. In various ones of these embodiments, when an instruction execution thread is in idle mode, bandwidth of processing environment 100 is not consumed or dedicated to the instruction execution thread, allowing processing environment 100 to allocate resources to other instruction execution threads, for example. When the idled instruction execution thread is again needed, processing environment 100 may wake up the idled instruction execution thread by again allocating resources to the instruction execution thread.

Figure 2:
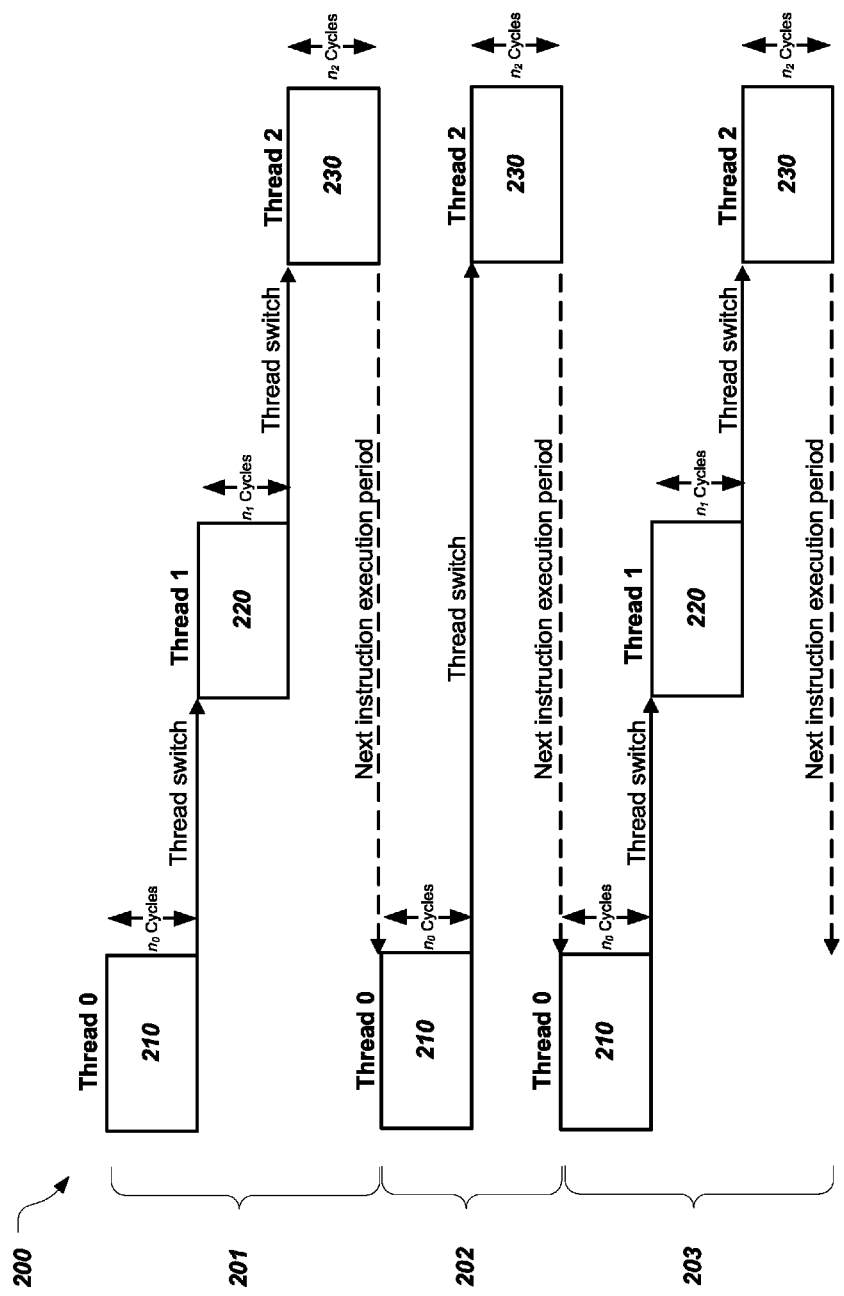
FIG. 2 illustrates threads switching on a multithread processing system, in accordance with various embodiments of the present invention.

Referring to FIG. 2, illustrated is an exemplary embodiment 200 of idling and waking of an instruction execution thread in accordance with various embodiments. A first instruction execution period 201, as illustrated, may include some number of execution cycles. In the first instruction execution period 201, scheduler 120 may allocate $n_0$ execution cycles of the processing resources to Thread 0, $n_1$ execution cycles of the processing resources to Thread 1, and $n_2$ execution cycles of the processing resources to Thread 2. These allocations may reflect relative bandwidth request (RBR) values found in the registers 116 for each of the threads, discussed more fully below. According to the RBR values, instructions from the threads (Thread 0, Thread 1, Thread 2) may be processed by execution circuitry 112 in multiple execution blocks 210, 220, 230. One or more of execution blocks 210 of Thread 0, execution blocks 220 of Thread 1, and execution blocks 230 of Thread 2 may be the same or different cycles in length, depending on the application. For example, Thread 0 might be allocated 25% of the processing resources, Thread 1 25%, and Thread 2 50%. In this example, if an instruction execution period includes four execution cycles, Thread 0 would be allocated one execution cycle, Thread 1 would be allocated one execution cycle, and Thread 2 would be allocated two execution cycles.

In any given execution period, one or more of the threads may not be required (e.g., there may be no instructions for that particular thread at that time). Rather than wasting processing resources on the unneeded thread, processing environment 100 may be configured to place the one or more unneeded threads into an idle mode. In a second execution period 202, for example, Thread 1 may be placed into an idle mode, with only execution blocks 210 of Thread 0 and execution blocks 230 of Thread 2 allocated execution cycles. Any execution cycles that would have been allocated to Thread 1 may then be allocated to one or more other threads. For example, in the exemplary scenario described above, the one execution cycle that had been allocated to Thread 1 during the first instruction execution period 201 may be allocated to either Thread 0 or Thread 2 in addition to any execution cycles they may already have. So, Thread 0 may be allocated two execution cycles rather than one execution cycle (or Thread 2 may be allocated thread execution cycles rather than two execution cycles).

According to various embodiments, an instruction execution thread may be placed into idle mode based at least in part on a modification to the instruction execution thread's RBR mode. In various embodiments, an instruction execution thread's RBR mode may be stored in one or more registers 116 associated with the instruction execution thread. The registers 116 may be configured to be modified to control the idling and/or waking of the associated instruction execution thread. In various embodiments, registers 116 may include a first control register associated with a first instruction execution thread, which may include a control bit for selectively idling the first instruction execution thread. For example, the control bit may be configured so that when set, the first instruction execution thread is in idle mode, and when un-set in the wake mode. Registers 116 may further include a second control register associated with a second instruction execution thread, which may include a second control bit for selectively idling the second instruction execution thread. Registers 116 may further include additional control registers associated with one or more other instruction execution threads, depending on the specific application.

In various embodiments, one or more of the registers 116 may be selectively modifiable by an instruction of one or more of the instruction execution threads. The instruction may be to idle another instruction execution thread and/or the requesting thread, which when executed by processing environment 100 may modify (set/unset) a control bit of a control register associated with the instruction execution thread to be idled.

In various embodiments, the control bit may also be modified to wake (un-idle) an idled instruction execution thread. In various embodiments, if scheduler 120 determines that an instruction execution thread is no longer in an idle mode, one or more execution cycles may then be allocated to the instruction execution thread according to the RBR mode. In the exemplary embodiment illustrated in FIG. 2, after second instruction execution period 202, Thread 1 may be again executed by waking up Thread 1. During a third instruction execution period 203 (or some subsequent instruction execution period) execution blocks 210 of Thread 0, execution blocks 220 of Thread 1, and execution blocks 230 of Thread 2 are allocated execution cycles.

In various embodiments, processing environment 100 may be configured to wake up an instruction execution thread in response to several predetermined situations. For example, an instruction execution thread may be woken up by an interrupt. In the embodiments, scheduler 120 may schedule the idled instruction execution thread for processing instructions of an interrupt service routine and then resume the idle mode. In other embodiments, the instructions of the interrupt service routine may include an instruction to modify the RBR mode of the instruction execution thread from the idle mode to the wake mode so that the instruction execution thread will not resume the idle mode upon completion of the interrupt service routine instructions.

In various embodiments, an instruction execution thread may be woken up by some other software instruction. For example, a first instruction execution thread may include an instruction to wake up a second instruction execution thread, which when executed modifies the second instruction execution thread's RBR mode from the idle mode to the wake mode. In various embodiments, the instruction to wake up an instruction execution thread may be an instruction to interrupt the instruction execution thread for processing an interrupt service routine as described above. In various embodiments, an instruction to wake up an instruction execution thread may be included in an exception handling routine so that when one or more exceptions are raised, an instruction execution thread may be woken up for processing the exception handling routine.

In various embodiments, upon waking a first instruction execution thread, instruction dispatcher 108 may be configured to fetch and issue at least one instruction of a second (and/or other) instruction execution thread prior to switching to the first instruction execution thread. For example, in various embodiments, when a first instruction execution thread is woken up, the second (and/or other) instruction execution thread may be allowed to finish processing any one or more instructions already in an instruction pipeline. In various embodiments, instruction dispatcher 108 may be configured to stop fetching and issuing instructions of the second instruction execution thread immediately upon waking of the first instruction execution thread. In various ones of these embodiments, any instruction(s) remaining in the instruction pipeline for the second instruction execution thread may be flushed (e.g., flushed from buffer 186).

In various embodiments, processing environment 100 may be configured to atomically idle a first instruction execution thread and wake a second instruction execution thread. For example, a first instruction execution thread may include an instruction to modify the control bit associated with the first instruction execution thread as well as an instruction to wake up a second instruction execution thread (e.g., by an interrupt instruction). Atomically idling an instruction execution thread and waking another may allow multiple threads to efficiently coordinate with each other. An instruction execution thread may perform a certain task before handing off responsibility to another so that no bandwidth is wasted on instruction execution threads that are not ready to be executed yet.

According to various embodiments, processing environment 100 may be configured to store a status of an instruction execution thread prior to or simultaneously with idling the instruction execution thread. For example, allocated execution cycles may be stored. Other statuses may also be stored including, for example, status of various control bits (e.g., interrupt masking bits, priority bits). In various embodiments, the stored status may be resumed upon waking of the instruction execution thread. For example, the instruction execution thread may allocate the same number of execution cycles (or percent relative to execution cycles allocated to other instruction execution threads) as it had at the time it went into idle mode.

In some embodiments, access to a control register and/or a control bit may be limited to the associated instruction execution thread. In the embodiments, access to a first control register and/or a first control bit associated with a first instruction execution thread may be configured so that only the first instruction execution thread may access the first control register and/or a first control bit. In other embodiments, however, one or more of the control registers may be accessible to non-associated instruction execution threads while another one or more of the control registers may be accessible by only the associated instruction execution thread. Such a configuration may be desired in applications wherein a master instruction execution thread may access registers of any one or more other threads ("child threads"), but not vice versa, so that it is impossible for all threads (child and master threads) to be idle at the same time. It is noted that in various embodiments, the term "access" may include either one or both of read access and write access.

Rather than limiting access to a control register and/or a control bit based on whether an instruction execution thread is associated with the control register and/or control bit, access may be based, at least in part, on a status mode of the instruction execution thread. In various embodiments, a status mode may allow an instruction execution thread to access and/or modify a control register and/or control bit associated with another instruction execution thread. One or more instruction execution threads may be modifiable between two or more status modes, depending on the application. For example, in some embodiments, an instruction execution thread may be modified between a user mode, with access restricted to its own control register and/or control bit, and a privileged mode (e.g., kernel mode, privilege mode as defined by Advanced RISC—Reduced Instruction Set Computer—Machine architecture, etc.), with limited or full access to a control register and/or control bit associated with another instruction execution thread.

Figure 3:
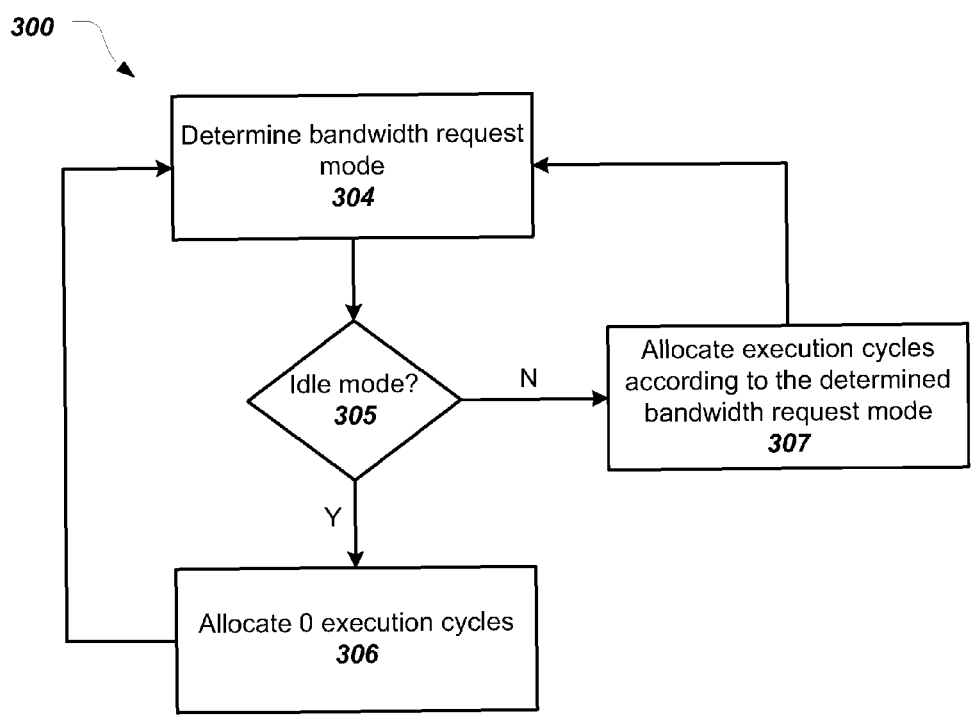
FIG. 3 is a flow diagram illustrating a portion of the operations associated with idling threads by a multithread processing system, in accordance with various embodiments of the present invention.

Turning now to FIG. 3, a method in accordance with various embodiments of the present invention are described in terms of computer firmware, software, and hardware with reference to a flow diagram. In various embodiments, portions of the method to be performed by a processing device may constitute state machines or computer programs made up of computer-executable instructions. These instructions are typically maintained in a storage medium accessible by the processing device. Describing the method by reference to a flow diagram may enable one skilled in the art to develop such programs including such instructions to carry out the method, and other methods in accordance with various embodiments of the present invention, on suitably configured processing devices, such as a multithread processor of a computing device executing the instruction execution threads from machine-accessible media. The computer-executable instructions may be written in a computer programming language or may be embodied in firmware logic. If written in a programming language conforming to a recognized standard, such instructions may be executed on a variety of hardware platforms and for interface to a variety of operating systems, such as multithread aware and non-multithread operating systems.

The various embodiments are not described with reference to any particular programming language. It will be appreciated by those skilled in the art that a variety of programming languages may be used to implement the teachings of at least one embodiment of the invention as described herein. Furthermore, it is common in the art to speak of software, in one form or another (e.g., program, procedure, process, application, etc.), as taking an action or causing a result. Such expressions are merely a shorthand way of saying that execution of the software by a network device causes the processor of the computer to perform an action or to produce a result.

Illustrated in FIG. 3 is a flow diagram of a portion of the operations associated with idling one or more threads by a multithread processing system 300 (e.g., such as ones previously described with reference to FIGS. 1 and 2), in accordance with various embodiments. As illustrated, multithread processing system 300 may determine a bandwidth request mode of one or more instruction execution threads in block 304. In various embodiments, multithread processing system 300 may determine whether the bandwidth request mode for an instruction execution thread is an idle mode in block 305. If the bandwidth request mode is an idle mode, multithread processing system 300 may allocate zero execution cycles to the instruction execution thread for the instruction execution period in block 306. If, however, the bandwidth request mode is other than an idle mode, multithread processing system 300 may allocate to the instruction execution thread the number (or relative percentage) of execution cycles according to the determined bandwidth request mode in block 307.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a scheduler configured to determine a bandwidth request mode of a plurality of instruction execution threads, wherein for each of the plurality of instruction execution threads:
   if the bandwidth request mode of a particular instruction execution thread is an idle mode, the scheduler is configured to allocate zero execution cycles of an instruction execution period of a multithread processing core to the particular instruction execution thread; or
   if the bandwidth request mode of the particular instruction execution thread is a wake mode, the scheduler is configured to allocate one or more execution cycles of the instruction execution period of the multithread processing core to the particular instruction execution thread;

the multithread processing core operatively coupled to the scheduler, the multithread processing core configured to execute instructions of the plurality of instruction execution threads according to allocation of the execution cycles of the instruction execution period of the multithread processing core provided by the scheduler; and a plurality of registers, each register (i) associated with a corresponding instruction execution thread and (ii) configured to store the corresponding bandwidth request mode, wherein the plurality of instruction execution threads includes at least (i) a first instruction execution thread associated with a first register of the plurality of registers, and (ii) a second instruction execution thread associated with a second register of the plurality of registers, wherein the first instruction execution thread is configured to access the first register and the second register to respectively modify (i) the bandwidth request mode of the first instruction execution thread and (ii) the bandwidth request mode of the second instruction execution thread, and wherein the second instruction execution thread is prohibited from accessing the first register to modify the bandwidth request mode of the first instruction execution thread.

2. The apparatus of claim 1, wherein the bandwidth request mode is modifiable between the idle mode and the wake mode.

3. The apparatus of claim 1, wherein the bandwidth request mode is modified from the idle mode to the wake mode in response to an interrupt or an exception.

4. The apparatus of claim 3, wherein the execution block is configured to execute one or more instructions of a service routine in response to (i) the interrupt or (ii) the exception.

5. The apparatus of claim 4, wherein at least one instruction of the service routine includes an instruction to modify the bandwidth request mode from the idle mode to the wake mode.

6. The apparatus of claim 1, wherein the apparatus is a processor.

7. The apparatus of claim 6, wherein the apparatus is an embedded processor.

8. The apparatus of claim 1, wherein the apparatus is an integrated circuit.

9. A method comprising:

determining, with a scheduler, a bandwidth request mode of a particular instruction execution thread of a plurality of instruction execution threads, wherein the plurality of instruction execution threads includes at least a first instruction execution thread and a second instruction execution thread;

allocating zero execution cycles of an instruction execution period of a multithread processing core to the particular instruction execution thread, if the bandwidth request mode of the particular instruction execution thread is an idle mode;

allocating one or more execution cycles of the instruction execution period of the multithread processing core to the particular instruction execution threads, if the bandwidth request mode of the particular instruction execution thread is a wake mode;

for each instruction execution thread of the plurality of instruction execution threads, storing the corresponding bandwidth request mode in a corresponding register, wherein the bandwidth request mode of the first instruction execution thread is stored in a first register, and the bandwidth request mode of the second instruction execution thread is stored in a second register;

allowing the first instruction execution thread to access the first register and the second register to respectively modify (i) the bandwidth request mode of the first instruction execution thread and (ii) the bandwidth request mode of the second instruction execution thread; and prohibiting the second instruction execution thread from accessing the first register to modify the bandwidth request mode of the first instruction execution thread.

10. The method of claim 9, further comprising executing, by the multithread processing core, instructions of the plurality of instruction execution threads according to the allocation of the bandwidth request mode.

11. The method of claim 9, further comprising modifying the bandwidth request mode to a selected one of the wake mode and the idle mode.

12. The method of claim 11, wherein the bandwidth request mode is modified by modifying a bit of a register associated with the first instruction execution thread.

13. The method of claim 11, wherein the bandwidth request mode is modified from the idle mode to the wake mode in response to an interrupt or an exception.

14. The method of claim 13, further comprising executing one or more instructions of a service routine in response to (i) the interrupt or (ii) the exception.

15. An article of manufacture comprising:

a storage medium; and a set of instructions stored in the storage medium, which when executed by a processor causes the processor to perform operations comprising:

determine a bandwidth request mode of a plurality of instruction execution threads, wherein the plurality of instruction execution threads comprises at least a first instruction execution thread and a second instruction execution thread, wherein for each of the plurality of instruction execution threads:

if the bandwidth request mode of a particular instruction execution thread is an idle mode, the operations allocate zero execution cycles of an instruction execution period of a multithread processing core to the particular instruction execution thread; or if the bandwidth request mode of the particular instruction execution thread is a wake mode, the operations allocate one or more execution cycles to the particular instruction execution thread;

for each instruction execution thread of the plurality of instruction execution threads, store the corresponding bandwidth request mode in a corresponding register, wherein the bandwidth request mode of the first instruction execution thread is stored in a first register, and the bandwidth request mode of the second instruction execution thread is stored in a second register;

allow the first instruction execution thread to access the first register and the second register to respectively modify each of (i) the bandwidth request mode of the first instruction execution thread and (ii) the bandwidth request mode of the second instruction execution thread; and prohibit the second instruction execution thread from accessing the first register to modify the bandwidth request mode of the first instruction execution thread.

16. The article of claim 15, wherein the operations further include modifying the bandwidth request mode from the idle mode to the wake mode in response to an interrupt or an exception.

17. The article of claim 16, wherein the operations further include executing one or more instructions of a service routine in response to (i) the interrupt or (ii) the exception.

18. An apparatus comprising:
- means for scheduling configured to determine a bandwidth request mode of a plurality of instruction execution threads, wherein the plurality of instruction execution threads include at least a first instruction execution thread and a second instruction execution thread, wherein for each of the plurality of instruction execution threads:
  - if the bandwidth request mode of a particular instruction execution thread is an idle mode, the means for scheduling are configured to allocate zero execution cycles of an instruction execution period of means for executing instructions to the particular instruction execution thread or
  - if the band request mode of the particular instruction execution thread is a wake mode, the means for scheduling are configured to allocate one or more execution cycles of the instruction execution period of the means for executing instructions to the particular instruction execution thread; and
- the means for executing instructions of the plurality of instruction execution threads according to allocation of the execution cycles of the instruction execution period of the means for executing instructions provided by the means for scheduling;
- for each instruction execution thread of the plurality of instruction execution threads, means for storing the corresponding bandwidth request mode in a corresponding register, wherein the bandwidth request mode of the first instruction execution thread is stored in a first register, and the bandwidth request mode of the second instruction execution thread is stored in a second register;
- means for allowing the first instruction execution thread to access the first register and the second register to respectively modify (i) the bandwidth request mode of the first instruction execution thread and (ii) the bandwidth request mode of the second instruction execution thread; and
- means for prohibiting the second instruction execution thread from accessing the first register to modify the bandwidth request mode of the first instruction execution thread.

19. The apparatus of claim 18, wherein the bandwidth request mode is modifiable between an idle mode and a wake mode.

20. The apparatus of claim 18, wherein the bandwidth request mode is modified from the idle mode to the wake mode in response to an interrupt or an exception.

21. The apparatus of claim 20, wherein the means for executing instructions is configured to execute one or more instructions of a service routine in response to (i) the interrupt or (ii) the exception.

22. The apparatus of claim 21, wherein at least one instruction of the service routine includes an instruction to modify the bandwidth request mode from the idle mode to the wake mode.

23. The apparatus of claim 18, wherein the apparatus is a processor.

24. The apparatus of claim 23, wherein the apparatus is an embedded processor.

25. The apparatus of claim 18, wherein the apparatus is an integrated circuit.

\* \* \* \* \*